(12) United States Patent
Triplett

(10) Patent No.: US 7,668,851 B2
(45) Date of Patent: Feb. 23, 2010

(54) LOCKLESS HASH TABLE LOOKUPS WHILE PERFORMING KEY UPDATE ON HASH TABLE ELEMENT

(75) Inventor: Joshua Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 11/564,568

(22) Filed: Nov. 29, 2006

(65) Prior Publication Data

US 2008/0126741 A1    May 29, 2008

(51) Int. Cl.
G06F 7/00 (2006.01)
(52) U.S. Cl. .............................. 707/101; 711/216; 707/8
(58) Field of Classification Search .................. 707/101, 707/8; 711/216
See application file for complete search history.

(56) References Cited

U.S. PATENT DOCUMENTS

| | | | |
|---|---|---|---|
| 5,909,695 A * | 6/1999 | Wong et al. | 711/133 |
| 6,115,802 A * | 9/2000 | Tock et al. | 711/216 |
| 6,202,136 B1 | 3/2001 | Wikle et al. | |
| 6,360,220 B1 | 3/2002 | Forin | |
| 6,633,879 B1 * | 10/2003 | Jeffries | 707/100 |
| 6,988,180 B2 | 1/2006 | Kadatch | |
| 2004/0107227 A1 | 6/2004 | Michael | |
| 2005/0223004 A1 * | 10/2005 | McKenney et al. | 707/8 |
| 2006/0112121 A1 * | 5/2006 | McKenney et al. | 707/101 |
| 2006/0156064 A1 * | 7/2006 | Damani et al. | 714/16 |

* cited by examiner

Primary Examiner—Tim T. Vo
Assistant Examiner—Mahesh H Dwivedi
(74) Attorney, Agent, or Firm—Walter W. Duft

(57) ABSTRACT

A system, method and computer program product for moving a shared list element from a first list location to a second list location includes making the list element appear simultaneously in the first list and the second list under a first key associated with the first list, changing the first key associated with the first list to a second key associated with the second list, and making the list element appear only in the second list under the second key associated with the second list.

14 Claims, 20 Drawing Sheets ratings ## LOCKLESS HASH TABLE LOOKUPS WHILE PERFORMING KEY UPDATE ON HASH TABLE ELEMENT

BACKGROUND OF THE INVENTION

1. Field of the Invention

The present invention relates to computer systems and methods in which a hash table can be accessed by software running concurrently on one or more processors. More particularly, the invention concerns an improved system and method that allows lock-free lookups of hash table elements while efficiently permitting concurrent update operations in which list element keys are updated.

2. Description of the Prior Art

By way of background, hash tables provide fast access times to items indexed by a key. They typically consist of an array of hash buckets each containing a linked list of elements that hash to the same bucket. As with most shared data structures, reading and writing a hash table concurrently by multiple tasks (e.g., processes, threads, etc.) requires some form of synchronization, and this synchronization incurs some overhead. The use of reader-writer locks, and the use of fine-grained per-bucket locking, can greatly reduce this overhead. However, any form of locking causes a serious performance hit even in the absence of contention due to the use of expensive atomic instructions, and due to bypassing the cache to read from memory.

It would be desirable to provide a hash table implementation that requires no locking or expensive instructions on the read side. Readers could thus run concurrently with writers and the contents of a hash bucket could be changed while readers traverse it. A challenge that has impeded the removal of read-side locking for hash table operations is how to perform a key update on a hash table element that results in the element being moved from one bucket to another. By way of example, this situation arises in the context of in-memory file system tree images used by operating systems to perform file name lookups for locating files maintained on block storage devices. In a directory entry hash table, directory entries (representing files) are assigned to hash buckets according to a hash algorithm based on their name and name of their parent directory. When a file's name is changed and/or the file is moved from one directory to another (referred to as a "rename" operation), the key associated with its corresponding element in the directory entry hash table will be updated and the element will often move between buckets.

Techniques must be used to perform these hash table operations without impacting readers who may be concurrently performing look-ups on the same file. Moreover, in computing environments conforming to the POSIX (Portable Operating System Interface) standard, the hash table manipulations must be performed atomically. This atomicity requires the following semantics:

If a reader does not see the old item in the hash table, subsequent lookups of the new item must succeed.

If a reader sees the new item, subsequent lookups of the old item must fail.

Two additional requirements must also be imposed in order to ensure correctness:

The move operation must not cause lookups for other items to fail.

Readers must never block (i.e., there must be bounded latency so that readers are not delayed indefinitely by the move operation).

Accordingly, a need exists for a technique that allows lockless hash table lookups while performing a key update on a hash table element that results in the element being moved from one hash bucket to another. More generally, because hash table buckets may be thought of individually as linked lists of key-value pairs, there is a related need for an improved strategy for atomically moving shared list elements from one list of key-value pairs to another while maintaining lock-free concurrency between writers and readers.

SUMMARY OF THE INVENTION

The foregoing problems are solved and an advance in the art is obtained by a method, system and computer program product for moving a shared list element from a first list to a second list. The list element is made to appear simultaneously in the first list and the second list under a first key associated with the first list. The first key associated with the first list is changed to a second key associated with the second list. The list element is then made to appear only in the second list under the second key associated with the second list.

According to exemplary embodiments disclosed herein, the first and second lists may comprise hash table buckets in a hash table and the key may be a hash table element key that determines a hash bucket to which the list element is assigned. The list element to be moved can be made to appear simultaneously in the first and second lists by cross-linking the first and second lists together. The list element can be made to appear only in the second list by uncross-linking the first and second lists. This is performed without disrupting readers performing a lockless lookup of the first list.

According to a first exemplary technique, the list element may be moved by (1) creating a copy of the list element on the first list and appending it to the end of the first list, (2) unlinking the list element from its predecessor element and linking the predecessor element to the list element's successor element, (3) cross-linking the first list to the second list by linking the last element of the second list to the list element copy on the first list, and (4) updating a key associated with the list element copy and uncross-linking the first list from the second list by unlinking the list element copy from the first list. Optionally, deferred removal of the list element may be performed following a period in which readers maintain no references to the list element.

According to a second exemplary technique, the list element may be moved by (1) cross-linking the first list to the second list by linking the last element of the second list to the list element on the first list, (2) updating a key associated with the list element, (3) unlinking the list element from its predecessor element and linking the predecessor element to the list element's successor element, (4) adding a pointer to the successor element to an array of pointers to additional elements that readers must search following a failed lookup, and (5) uncross-linking the first list from the second list by unlinking the list element from the first list. Optionally, deferred removal of the target element (and any element pointers added to the additional element pointer array) may be performed following a period in which readers maintain no references to the placeholder element.

According to a third exemplary technique, the list element may be moved by (1) cross-linking the first list to the second list by linking the last element of the second list to the list element on the first list, (2) updating a key associated with the list element, (3) unlinking the list element from its predecessor element and linking the predecessor element to the list element's successor element, (4) setting an old next pointer associated with the list element to a current next pointer associated with the list element, and (5) uncross-linking the first list from the second list by unlinking the list element from the first list by changing the current next pointer to NULL. Optionally deferred clearing of the old next pointer of the list element may be performed following a period in which readers maintain no references to the list element.

According to a further exemplary technique, readers attempting to search the first list may retry the search using a synchronization technique (such as locking) in the event of a search failure due to the list element appearing only in the second list.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Introduction

Before describing exemplary techniques that may be used to perform key updates on hash table elements, there are two observations regarding hash table searching that will aid the reader in understanding the discussion to follow. First, after using the hash of a search key to find an appropriate hash table bucket, a reader must compare the individual keys of the elements (hash table elements may be referred to hereinafter as nodes) in the list for that bucket to the actual search key. If a node shows up in a bucket to which its key does not hash, no harm befalls any reader who comes across that node while searching the bucket. Second, when traversing the list for a given hash bucket, a reader will stop when it encounters the first node matching the search key. If a node occurs twice in the same bucket, the search algorithm will simply return the first such node when searching for its key, or ignore both nodes if searching for a different key. Thus, a node can safely occur more than once in a given hash bucket.

Figure 1:
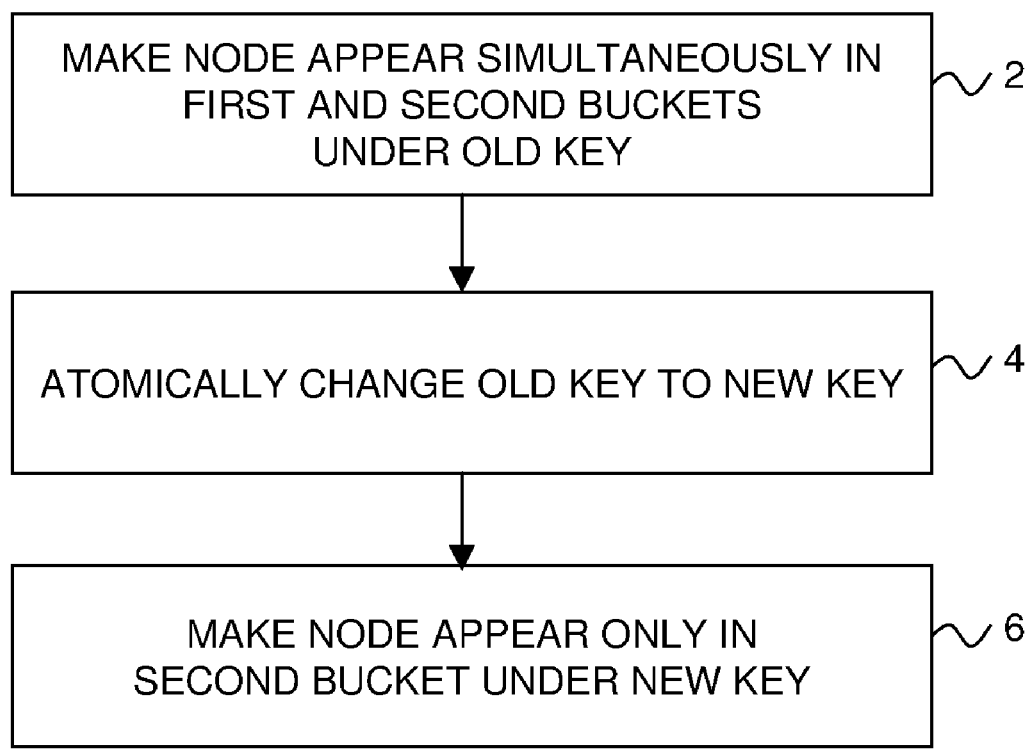
FIG. 1 is a flow diagram showing exemplary steps for performing a key element update.

As described by way of background above, the first two semantic rules governing the updating of hash node keys are that a node lookup must never find the node appearing in two buckets simultaneously or in neither bucket. Violation of these rules will occur when a writer does not simultaneously remove the node from the old bucket and add it to the new bucket with the new key. Most modern processor architectures do not feature memory-to-memory swaps or simultaneous writes to multiple locations, so a writer cannot simultaneously and atomically change multiple pointers or multiple keys. However, if the writer can make the node getting moved (the target node) appear in both buckets simultaneously (with only the old key), the writer can in one operation remove the target node from the old bucket and add it to the new bucket, by atomically changing the original key to the new key. These steps are shown in the flow diagram of FIG. 1 by way of reference numbers 2 and 4, respectively. Before the change, searches in the old bucket using the old key will find the target node, and searches in the new bucket using the new key will always skip over it; after the change, searches in the old bucket with the old key will always skip over the target node, and searches in the new bucket with the new key will find it. Because nodes can safely appear in buckets to which their keys do not hash, the writer can make the node appear in both buckets by cross-linking one hash bucket (chain) to the other. The writer can then change the node's key to the new value, and thereafter make the target node only appear in the new bucket, as by uncross-linking the chains. This step is shown in FIG. 1 by way of reference number 6. When removing the cross-link, the writer must ensure that it does not disturb any reader currently traversing the old hash bucket, even if that reader currently sits on the target node. In particular, concurrent readers searching for nodes in the old hash chain that follow the target node should not be impacted. Set forth hereinafter are three exemplary embodiments that present techniques for safely resolving this cross-linking issue, with various performance tradeoffs and pointer lifetime semantics.

First Exemplary Embodiment

Figure 2A:
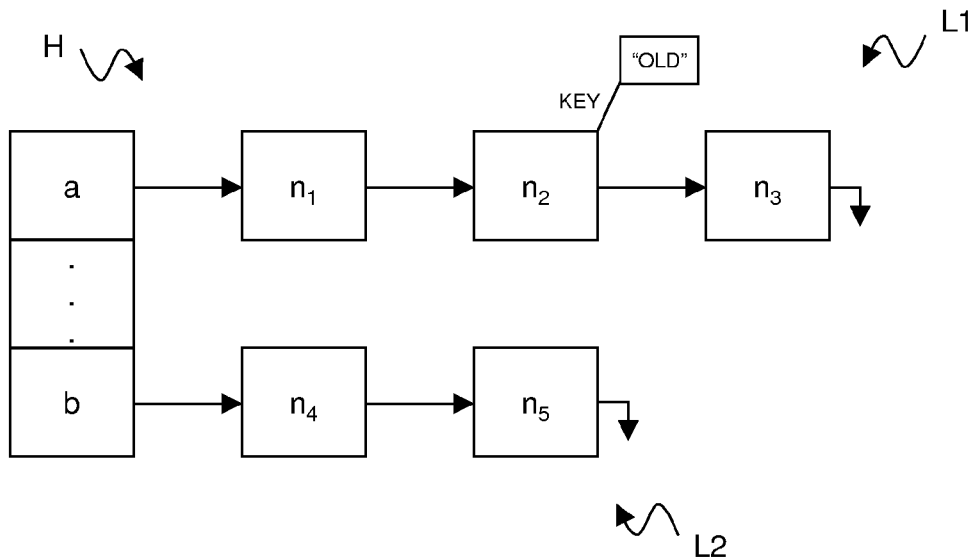
FIGS. 2A-2I are diagrammatic representations showing an exemplary hash table comprising at least two hash buckets each having plural hash table element during operations in which a hash table element is atomically moved between two hash buckets according to a first exemplary embodiment.
Figure 2B:
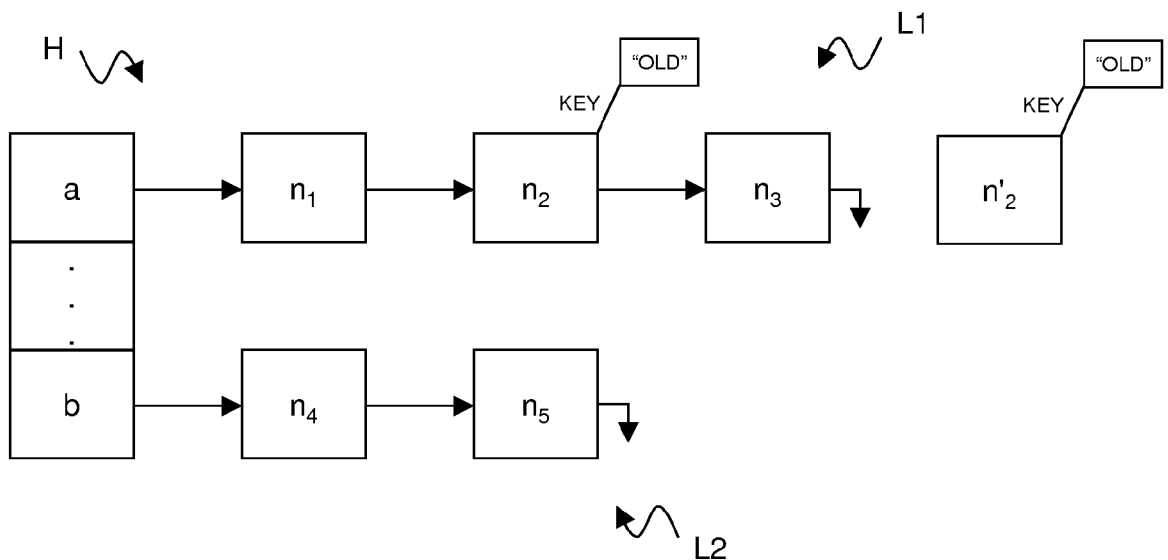
Figure 2C:
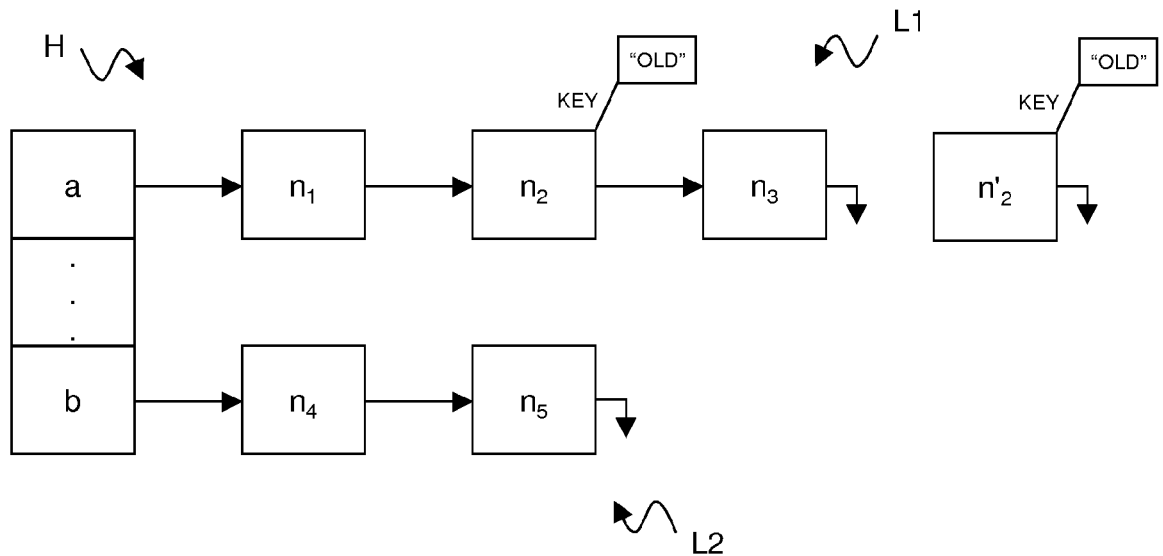
Figure 2D:
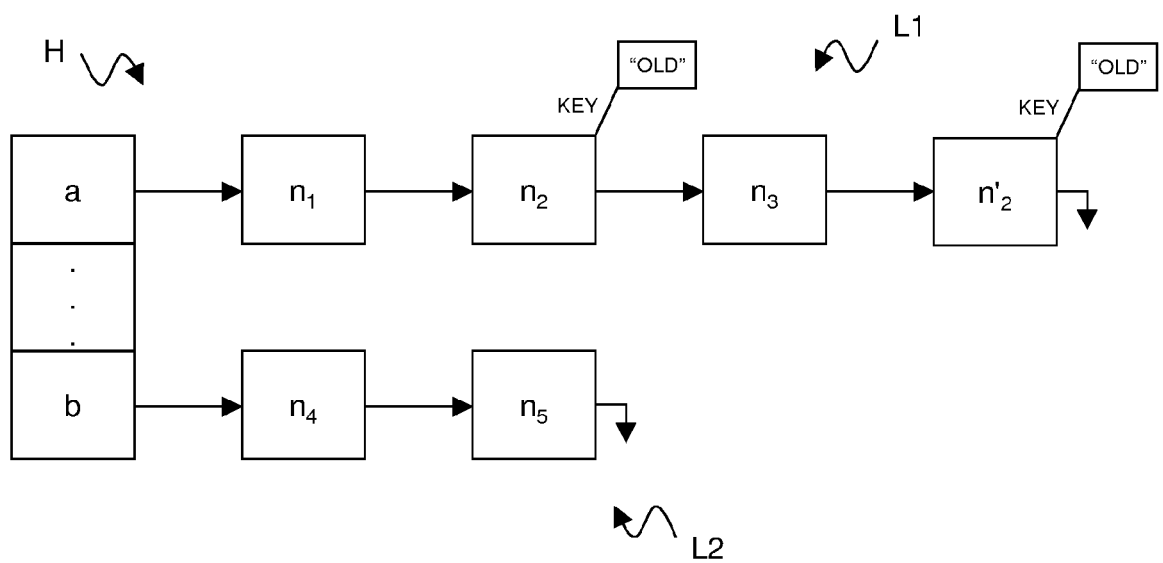

Turning now to FIGS. 2A-2I, a first exemplary technique will be described with reference to a hash table "H" that comprises at least two lists "L1" and "L2" representing hash buckets "a" and "b," respectively. FIG. 2A illustrates the initial state of the hash table "H." Nodes $n_1$, $n_2$, and $n_3$ represent the nodes having keys ($n_1$.key, $n_2$.key and $n_3$.key) that hash to bucket "a." Nodes $n_4$ and $n_5$ represent the nodes having keys ($n_4$.key and $n_5$.key) that hash to bucket "b." Node $n_2$ currently has an original key "OLD", which hashes to bucket "a." It is assumed that this key needs to change to a new key "NEW," which hashes to bucket "b." The flow diagram of FIGS. 3A-3B illustrates the various steps described hereinafter for performing the desired key update.

Figure 3A:
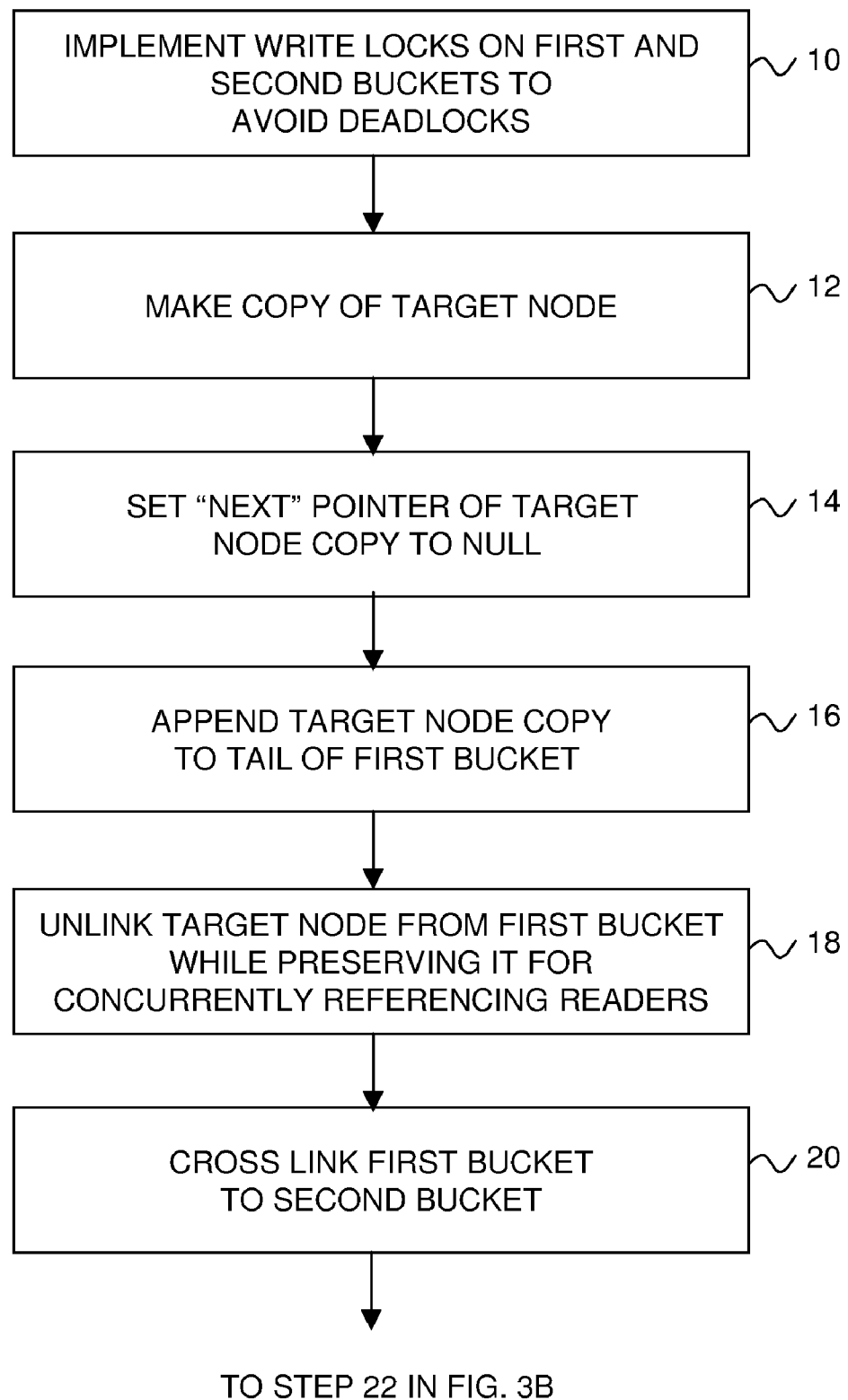
FIGS. 3A-3B represent a flow diagram showing exemplary steps that may be used by a writer to move a list element between lists in accordance with FIGS. 2A-2I.

In a first step 10 of FIG. 3A, the writer that performs the key update obtains write locks in a defined order for the hash buckets "a" (the first bucket) and "b" (the second bucket) to avoid deadlocks. In lieu of using write locks in step 10, writers could also use other known write-side synchronization techniques, such as lock-free or wait-free synchronization. As shown in FIG. 2B (step 12 of FIG. 3A), the writer then makes a copy of node $n_2$ (the target node) named node $n'_2$. As shown in FIG. 2C (step 14 of FIG. 3A), the "next" pointer of the target node copy node $n'_2$ ($n'_2$.next) is set to NULL (e.g., a reference value such as zero to signify that the pointer refers to no object). Null pointers are represented in the drawings by downwardly bent arrows. As shown in FIG. 2D (step 16 of FIG. 3A), the target node copy $n'_2$ is appended to the tail of bucket "a" by changing the next pointer of node $n_3$ ($n_3$.next) from NULL to $n'_2$. Prior to this operation, a write memory barrier may be implemented to ensure that the change of the $n'_2$.next pointer to NULL in step 14 will appear to other processors as preceding the change of the $n_3$.next pointer to point to $n'_2$. Otherwise, a reader could follow $n_3$.next to $n'_2$ and then see an invalid $n'_2$.next pointer.

Figure 2E:
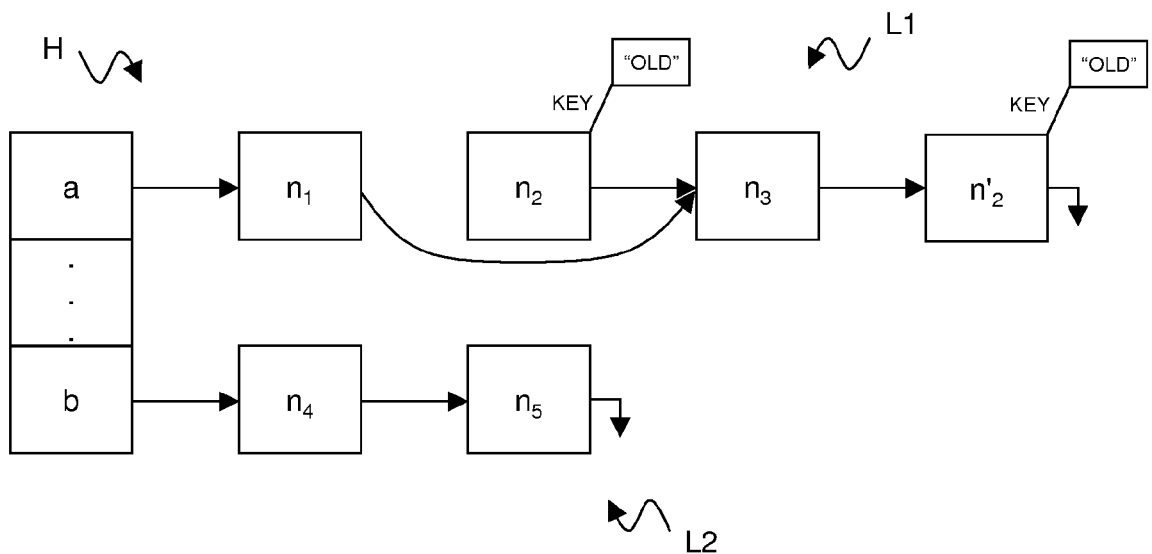
Figure 2F:
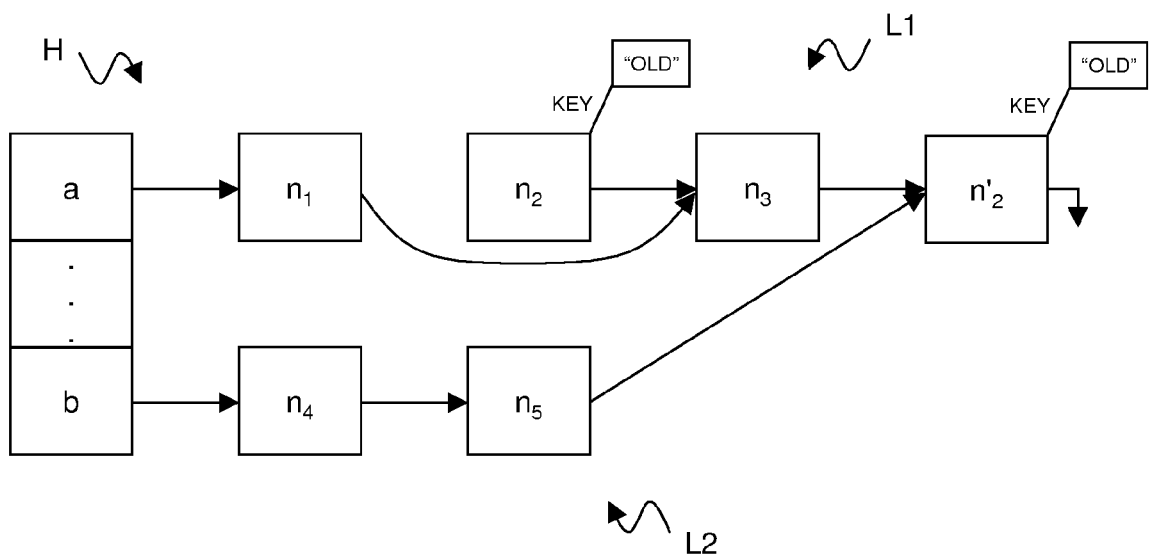
Figure 2G:
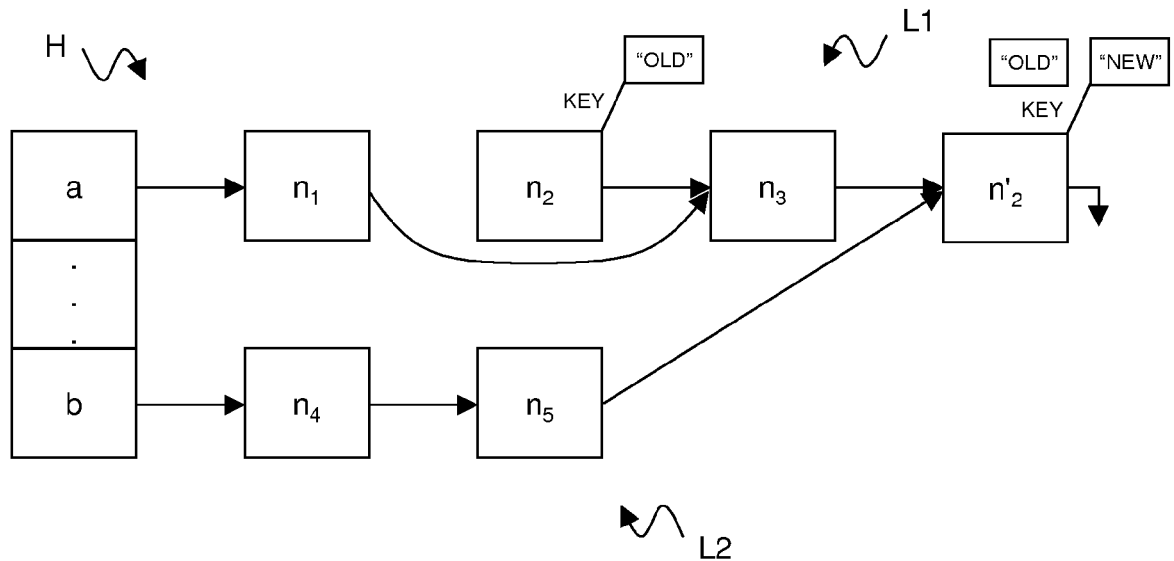
Figure 2H:
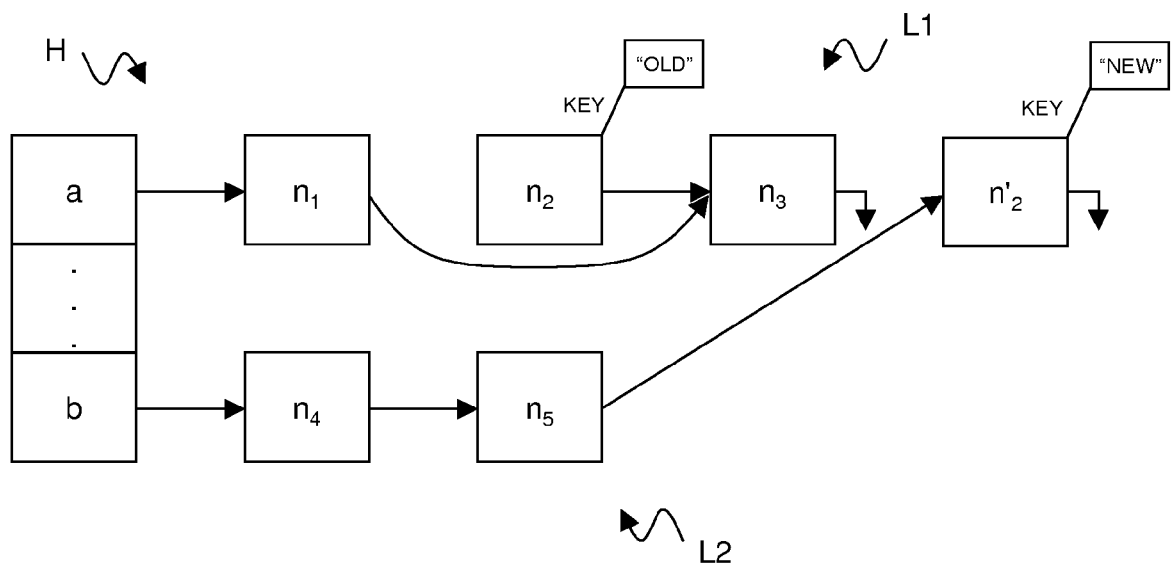
Figure 2I:
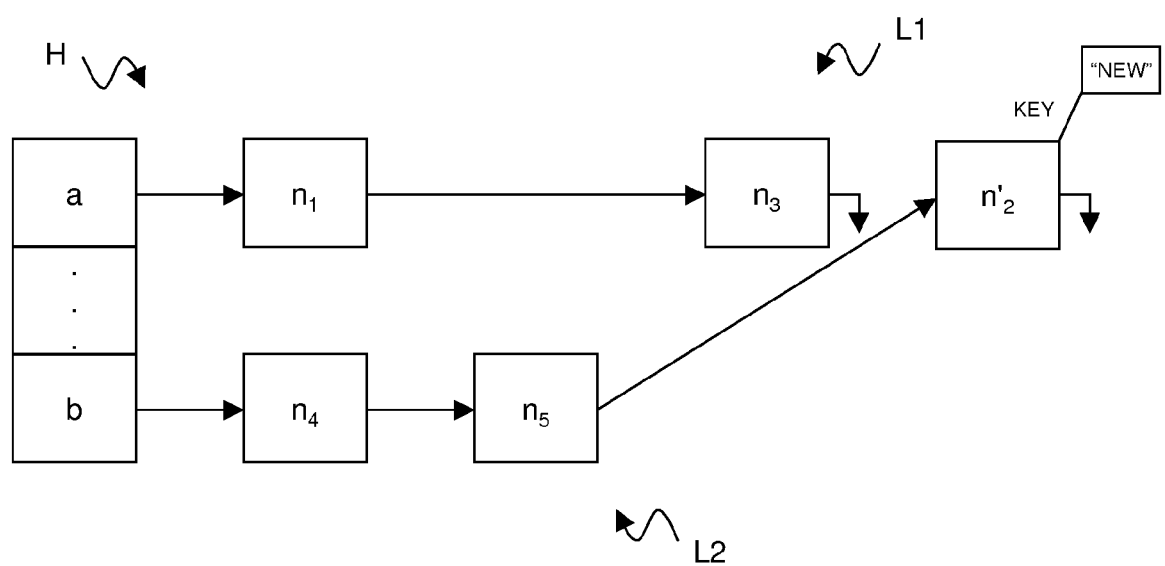
Figure 3B:
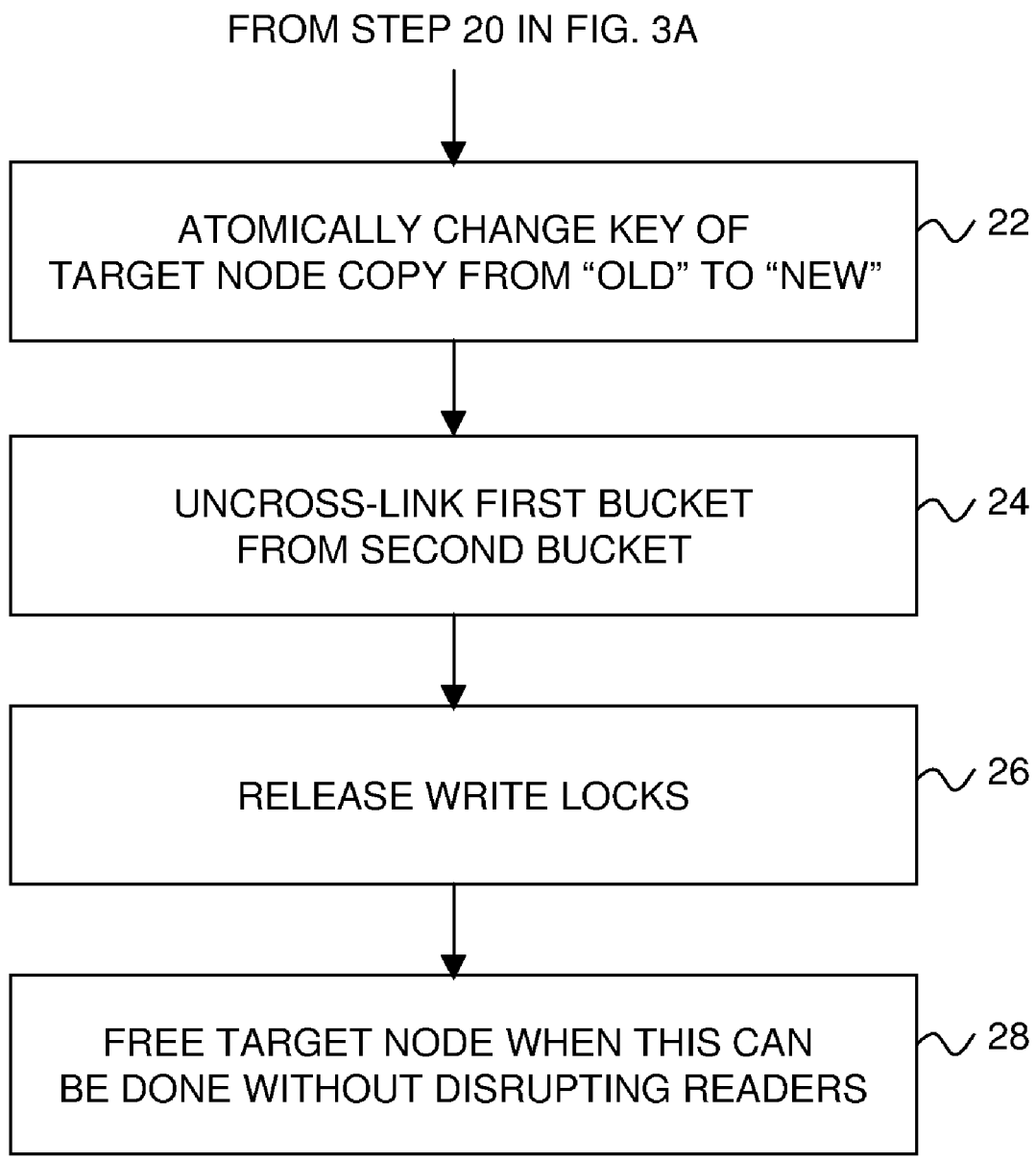

As shown in FIG. 2E (step 18 of FIG. 3A), the target node $n_2$ is unlinked from the bucket "a" without disrupting readers that may be currently referencing this node. This is done by unlinking the target node $n_2$ from its predecessor element node $n_1$ and linking the predecessor node $n_1$ to the target node's successor node $n_3$. In other words, $n_1$.next is changed from $n_2$ to $n_3$. Prior to this operation, another write memory barrier may be implemented to ensure that the previous change of the $n_3$.next pointer to point to $n'_2$ in step 16 will appear to other processors as preceding the change of the $n_1$.next pointer from $n_2$ to $n_3$. Otherwise, a reader could follow the $n_1$.next pointer to $n_3$ and then see a NULL pointer instead of a pointer to $n'_2$, thus missing the $n'_2$ copy node. As shown in FIG. 2F (step 20 of FIG. 3A), bucket "a" is cross-linked to bucket "b" by pointing the tail of bucket "b" ($n_5$.next) to the target node copy $n'_2$. Both hash chains now include $n'_2$. As shown in FIG. 2G (step 22 of FIG. 3B), the key of the target node copy $n'_2$ is changed atomically from "OLD" to "NEW." As shown in FIG. 2H (step 24 of FIG. 3B), bucket "a" is uncross-linked from bucket "b" by unlinking the target node copy $n'_2$ from its predecessor node $n_3$. In other words, $n_3$.next is changed from $n'_2$ to NULL. The previously acquired write locks for buckets "a" and "b" are then released in step 26 of FIG. 3B. As shown in FIG. 2I (step 28 of FIG. 3B), the target node $n_2$ together with the "OLD" key may be freed after it is safe to do so without disrupting readers that may have been referencing node $n_2$ when the current write operation commenced. There are various ways that the deferred removal of node $n_2$ may be performed, including RCU (Read-Copy Update), hazard pointers, and other synchronization techniques. For example, if RCU is used, the RCU primitive rcu_assign_pointer may be used in step 18 (FIG. 2E) to update the pointer $n_1$.next from $n_2$ to $n_3$. This operation will implement a write memory barrier and change the pointer assignment. Step 26 may then be performed by the writer by using the RCU synchronize_rcu or call_rcu calls to execute the callback and perform the required removal of $n_2$ when it is safe to do so. Alternatively, step 26 could be omitted in implementations where there is no need to free node $n_2$.

Second Exemplary Embodiment

Turning now to FIGS. 4A-4I, a second exemplary technique will be described, again with reference to a hash table "H" that comprises at least two lists "L1" and "L2" representing hash buckets "a" and "b," respectively. With this technique, the hash table "H" also includes an array "A" that identifies additional nodes to search, and readers must search those nodes if their search reaches the end of a hash chain. Each element of the array "A" is a pointer to a node of the hash table "H" that follows a node whose key is being modified. Thus, in the illustrated embodiment wherein the node $n_2$ is being updated, a pointer to the node $n_3$ will be added to the array "A." By consulting this pointer, a reader referencing the node $n_2$ at the time it is moved from hash bucket "a" to hash bucket "b" will be able to continue its traversal of bucket "a." If there were nodes following $n_3$, pointers to these nodes could also be added to the array "A." The elements of the array "A" are initially NULL pointers. As pointers to hash table nodes are added and deleted, the array "A" may develop "holes" as some array element pointers are returned to NULL values. The array "A" can stay at a fixed size and have holes, in which case the readers have a bounded additional cost, but writers must block if all of the array slots become filled. Alternatively, the array "A" could grow dynamically and have a terminating sentinel at the end, in which case the additional cost to readers depends on the number of writes, and writers must copy the entire array and atomically replace the array pointer when resizing.

Figure 4A:
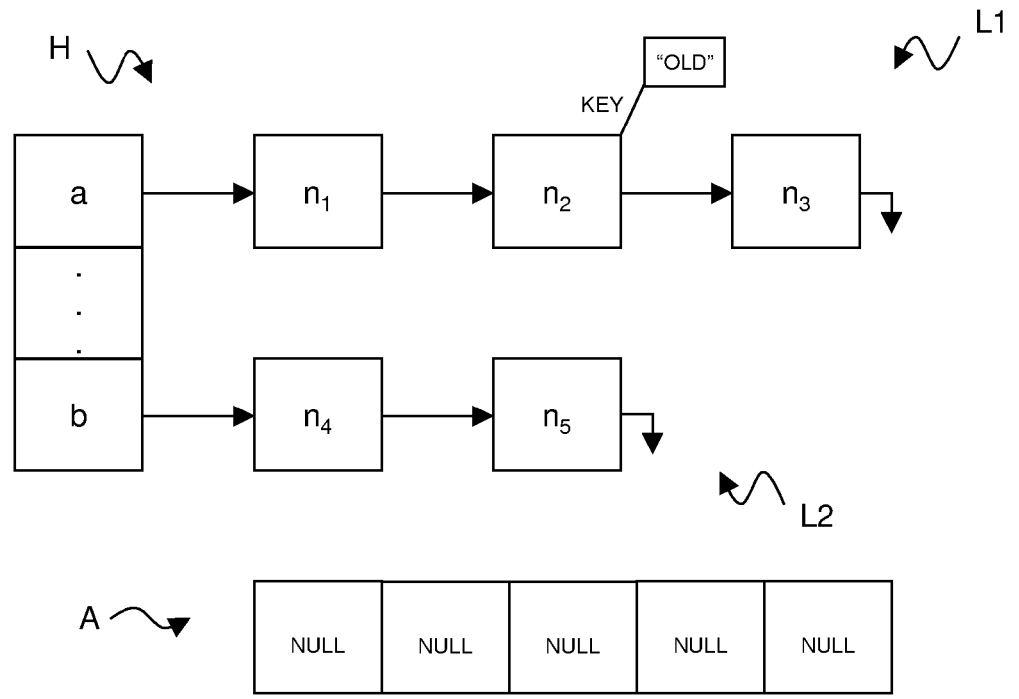
FIGS. 4A-4G are diagrammatic representations showing an exemplary hash table comprising at least two hash buckets each having plural hash table element during operations in which a hash table element is atomically moved between two hash buckets according to a second exemplary embodiment.
Figure 5:
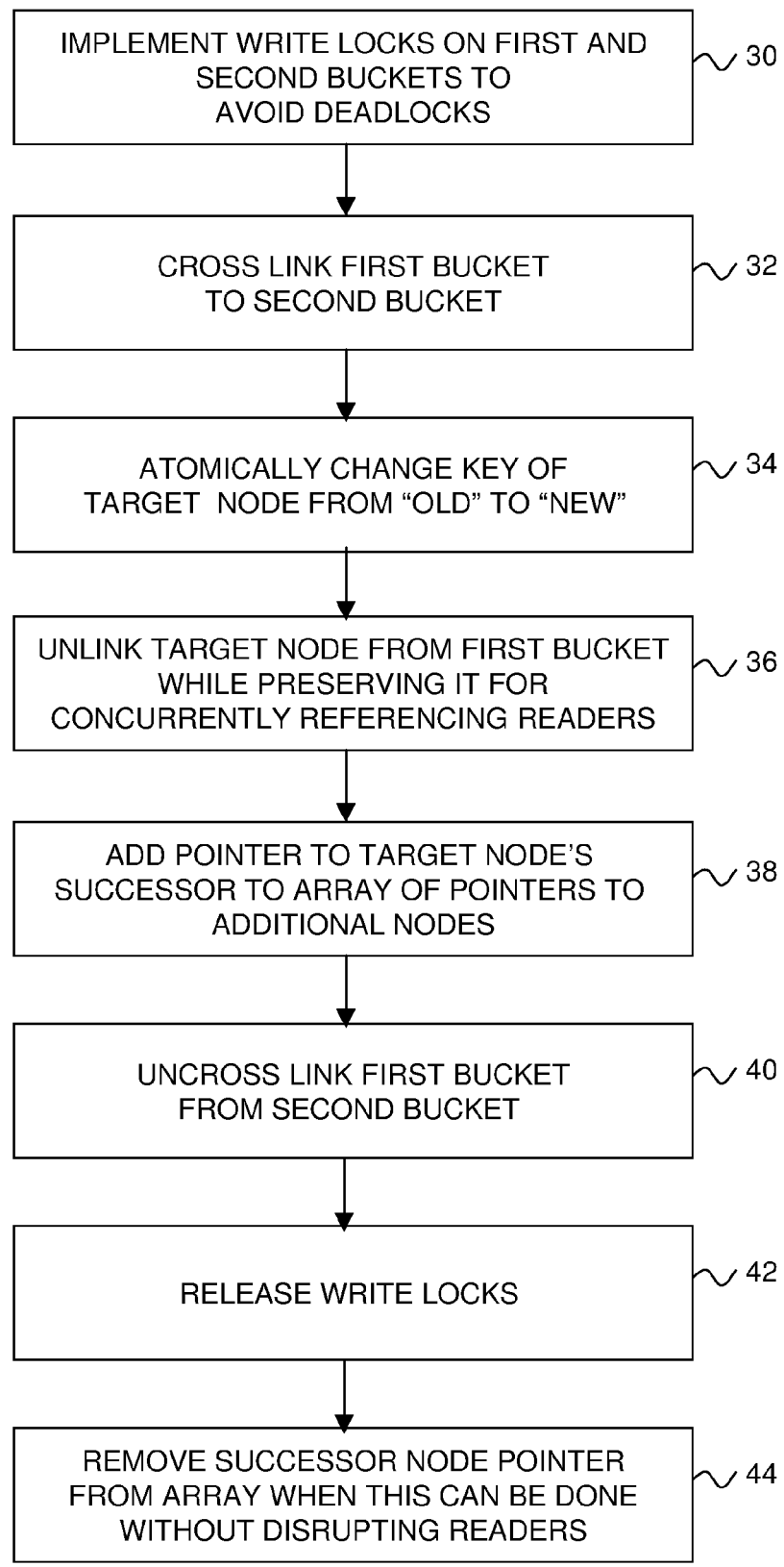
FIG. 5 is a flow diagram showing exemplary steps that may be used by a writer to move a list element between lists in accordance with FIGS. 4A-4G.

FIG. 4A illustrates the initial state of the hash table "H." Nodes $n_1$, $n_2$, and $n_3$ represent the nodes having keys ($n_1$.key, $n_2$.key and $n_3$.key) that hash to bucket "a." Nodes $n_4$ and $n_5$ represent the nodes having keys ($n_4$.key and $n_5$.key) that hash to bucket "b." Node $n_2$ currently has an original key "OLD", which hashes to bucket "a." It is assumed that this key needs to change to a new key "NEW," which hashes to bucket "b." The flow diagram of FIG. 5 illustrates the various steps described hereinafter for performing the desired key update.

Figure 4B:
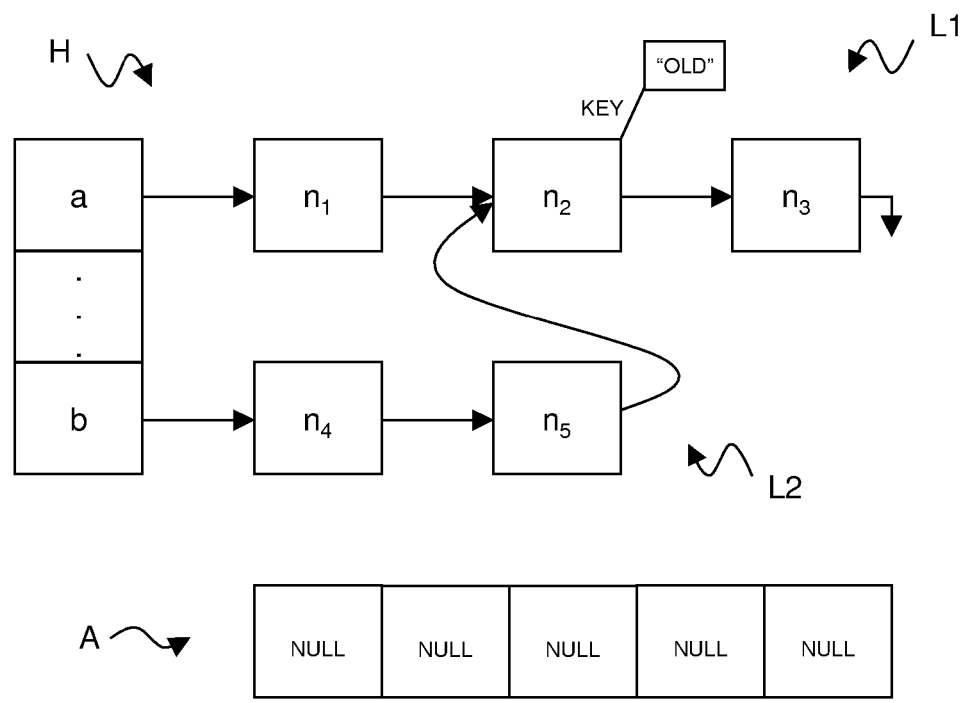
Figure 4C:
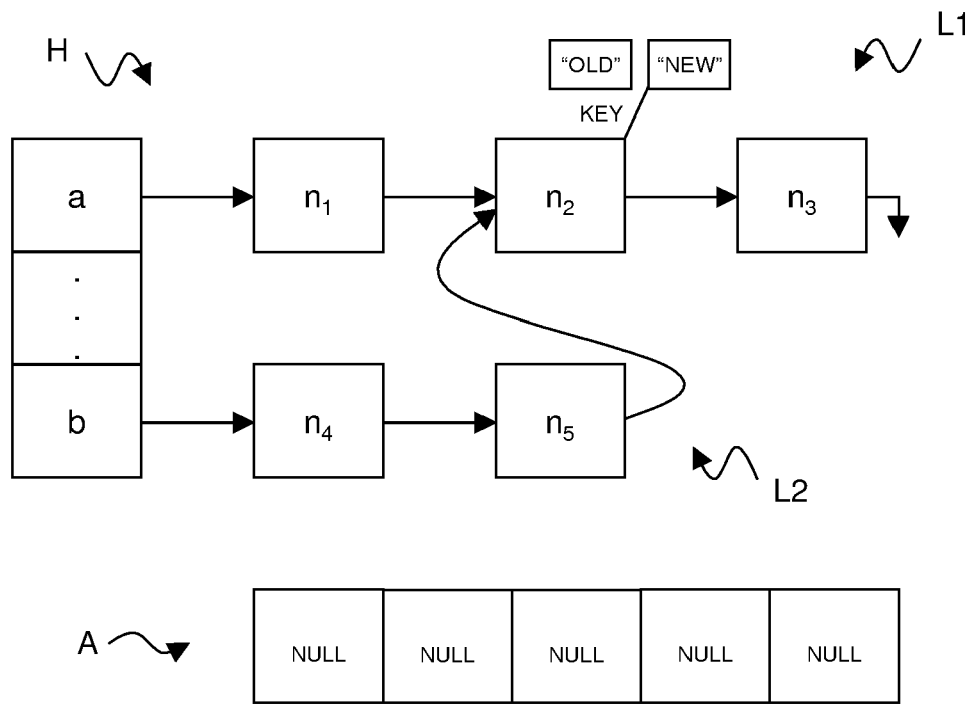
Figure 4D:
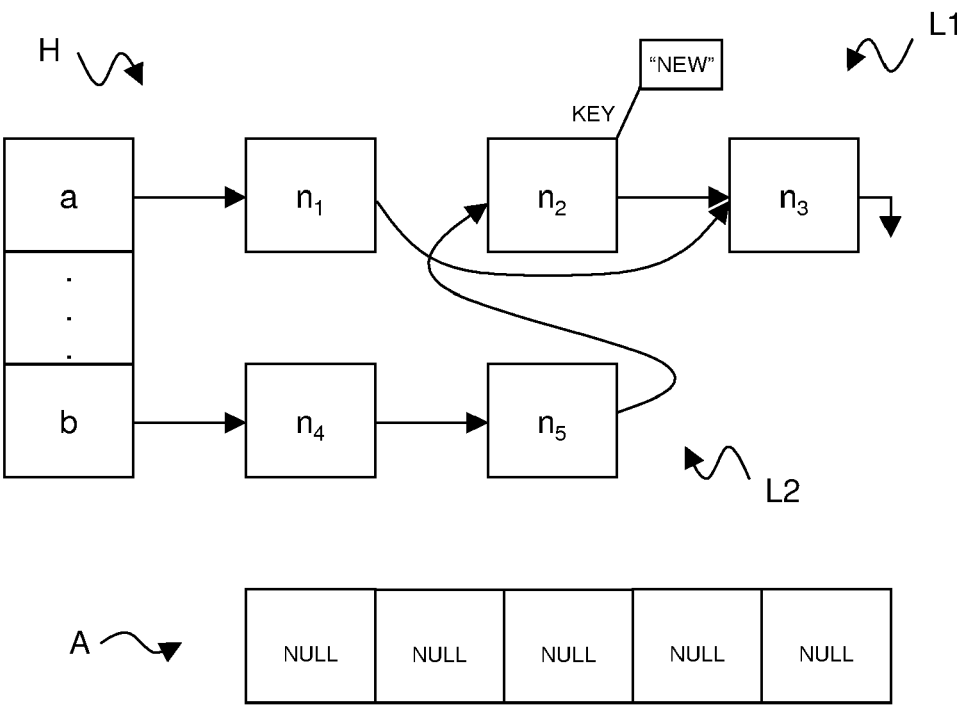
Figure 4E:
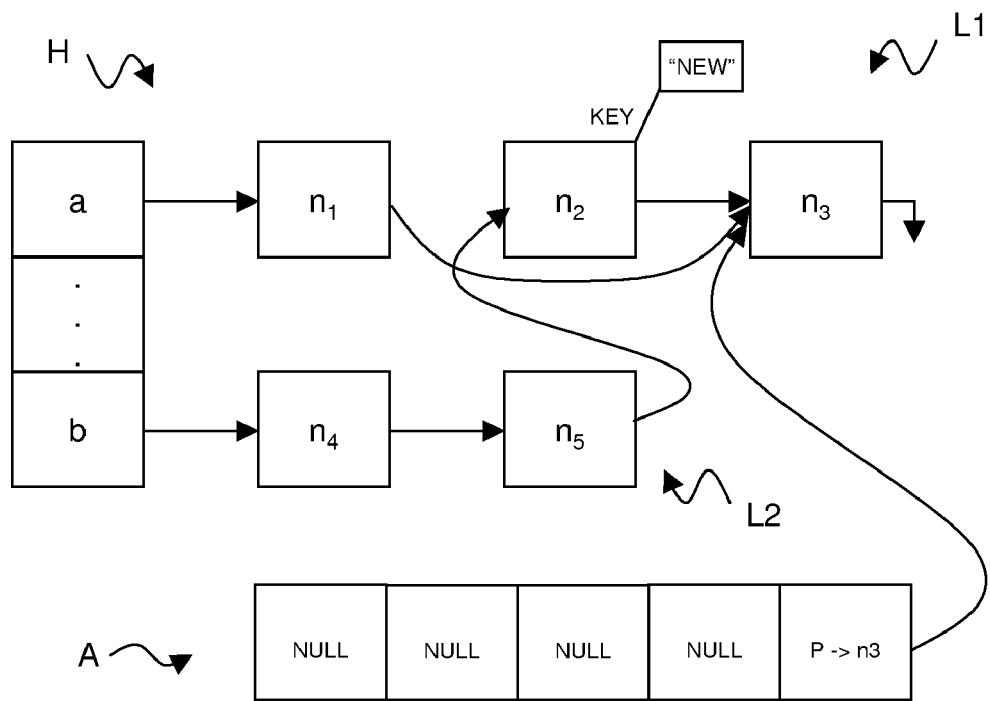
Figure 4F:
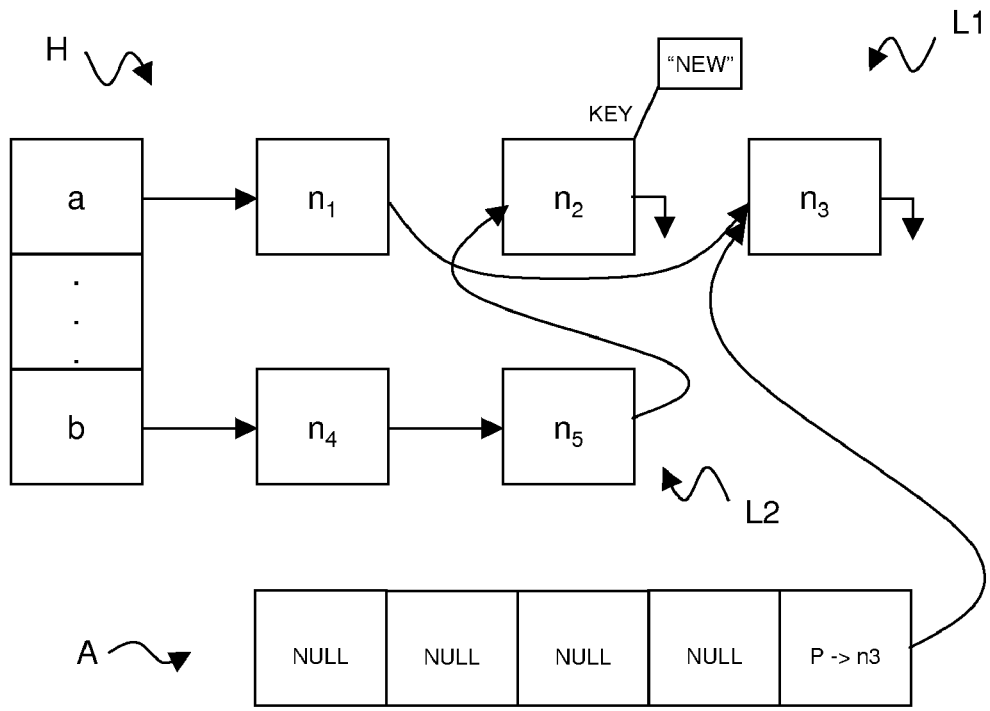
Figure 4G:
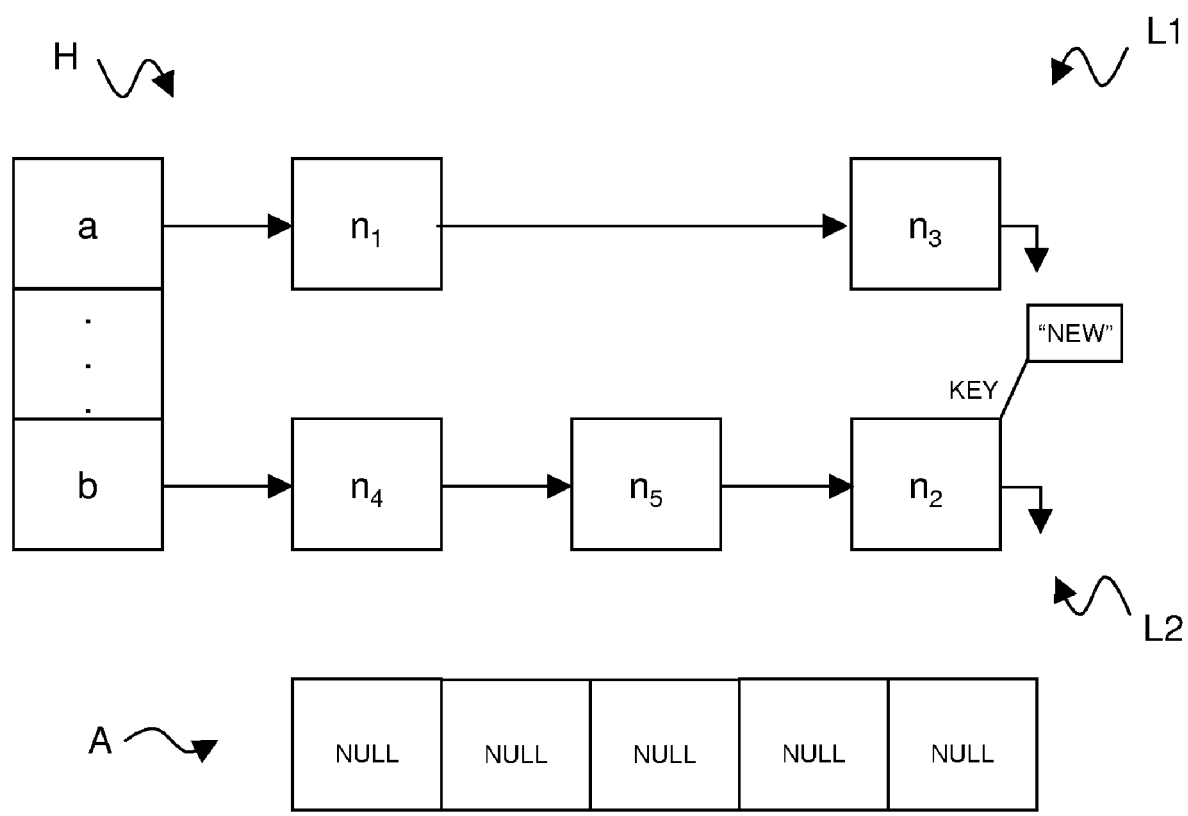

In a first step 30 of FIG. 5, the writer that performs the key update obtains write locks in a defined order for the hash buckets "a" (the first bucket) and "b" (the second bucket) to avoid deadlocks. In lieu of using write locks in step 30, writers could also use other known write-side synchronization techniques, such as lock-free or wait-free synchronization. As shown in FIG. 4B (step 32 of FIG. 5), bucket "a" is cross-linked to bucket "b" by pointing the tail of bucket "b" ($n_5$.next) to the target node $n_2$. Both hash chains now include $n_2$. As shown in FIG. 4C (step 34 of FIG. 5), the key of the target node $n_2$ is changed atomically from "OLD" to "NEW." As shown in FIG. 4D (step 36 of FIG. 5), the target node $n_2$ is unlinked from the bucket "a" without disrupting readers that may be currently referencing this node. This is done by unlinking the target node $n_2$ from its predecessor element node $n_1$ and linking the predecessor node $n_1$ to the target node's successor node $n_3$. In other words, $n_1$.next is changed from $n_2$ to $n_3$. As shown in FIG. 4E (step 38 of FIG. 5), a pointer to the node $n_3$ is added to the array "A" of additional nodes to search, following which a write memory barrier may be implemented to ensure that the addition of the $n_3$ pointer to the array "A" will appear to other processors as preceding subsequent step 40 in which hash buckets "a" and "b" are unlinked from each other. Otherwise, a reader reaching the updated $n_2$ node might not find the $n_3$ pointer in the array "A." As shown in FIG. 4F (step 40 of FIG. 5), bucket "a" is uncross-linked from bucket "b" by unlinking the target node $n_2$ from its successor node $n_3$. In other words, $n_2$.next is changed from $n_3$ to NULL. The previously acquired write locks for buckets "a" and "b" are then released in step 42 of FIG. 5. It is at this point that the array "A" becomes significant. Without this array, if a reader traversing bucket "a" happened to be referencing node $n_2$ at the time $n_2$.next is NULLed in step 40 (i.e. during the transition from FIG. 4E to 4F), the reader would not know that node $n_3$ exists and so would not see that node or any list elements that follow it. On the other hand, if the array "A" is present and the reader is trained to consult the array when the end of a list is reached (i.e., a NULL pointer is found), the reader will find the array element that is a pointer to node $n_3$ and thus follow the pointer to node $n_3$, allowing the reader to continue traversing the list. As shown in FIG. 4G (step 44 of FIG. 5), the pointer to node $n_3$ may be removed from the array "A" after it is safe to do so without disrupting readers that may have been referencing node $n_2$ when the current write operation commenced. The target node's "OLD" key may also be freed. As in the first embodiment, there are various ways that these deferred operations may be performed, including RCU (Read-Copy Update), hazard pointers, and other synchronization techniques. Alternatively, step 44 could be omitted in some implementations.

Third Exemplary Embodiment

Turning now to FIGS. 6A-6I, a third exemplary technique will be described, again with reference to a hash table "H" that comprises at least two lists "L1" and "L2" representing hash buckets "a" and "b," respectively. With this technique, the nodes of the hash table "H" include two next pointers. One of the next pointers is a current next pointer "n.next" that references a node's current successor. The other next pointer is an old next pointer "n.oldnext" that references a node's previous successor (before an update operation). When readers reach a node whose current next pointer n.next is the NULL pointer, they are expected to consult the node's old next pointer n.oldnext. If the old next pointer is not the NULL pointer, the readers must follow the old next pointer to continue traversing the bucket.

Figure 6A:
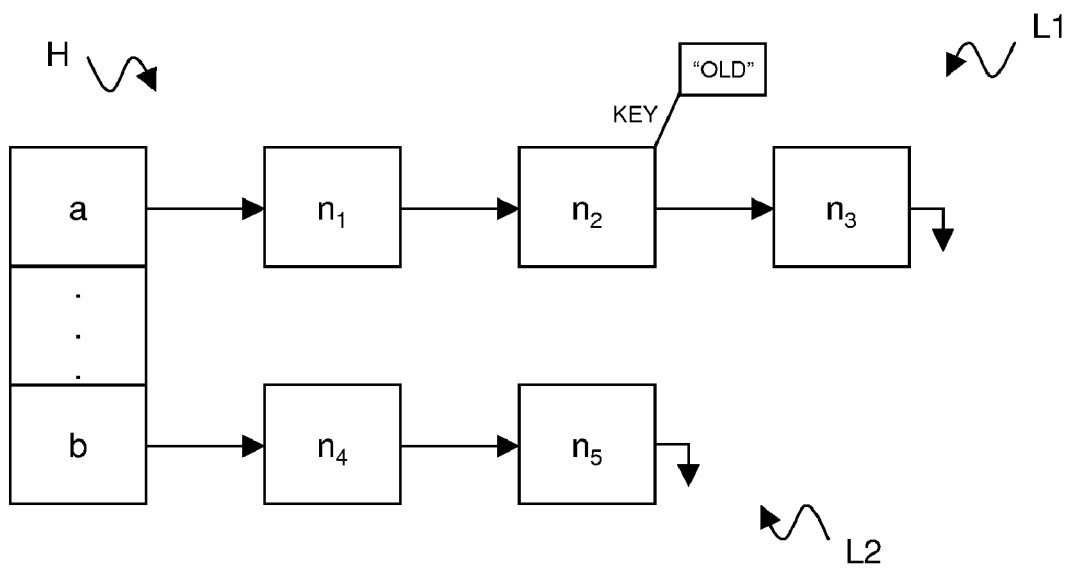
FIGS. 6A-6G are diagrammatic representations showing an exemplary hash table comprising at least two hash buckets each having plural hash table element during operations in which a hash table element is atomically moved between two hash buckets according to a second exemplary embodiment.
Figure 7:
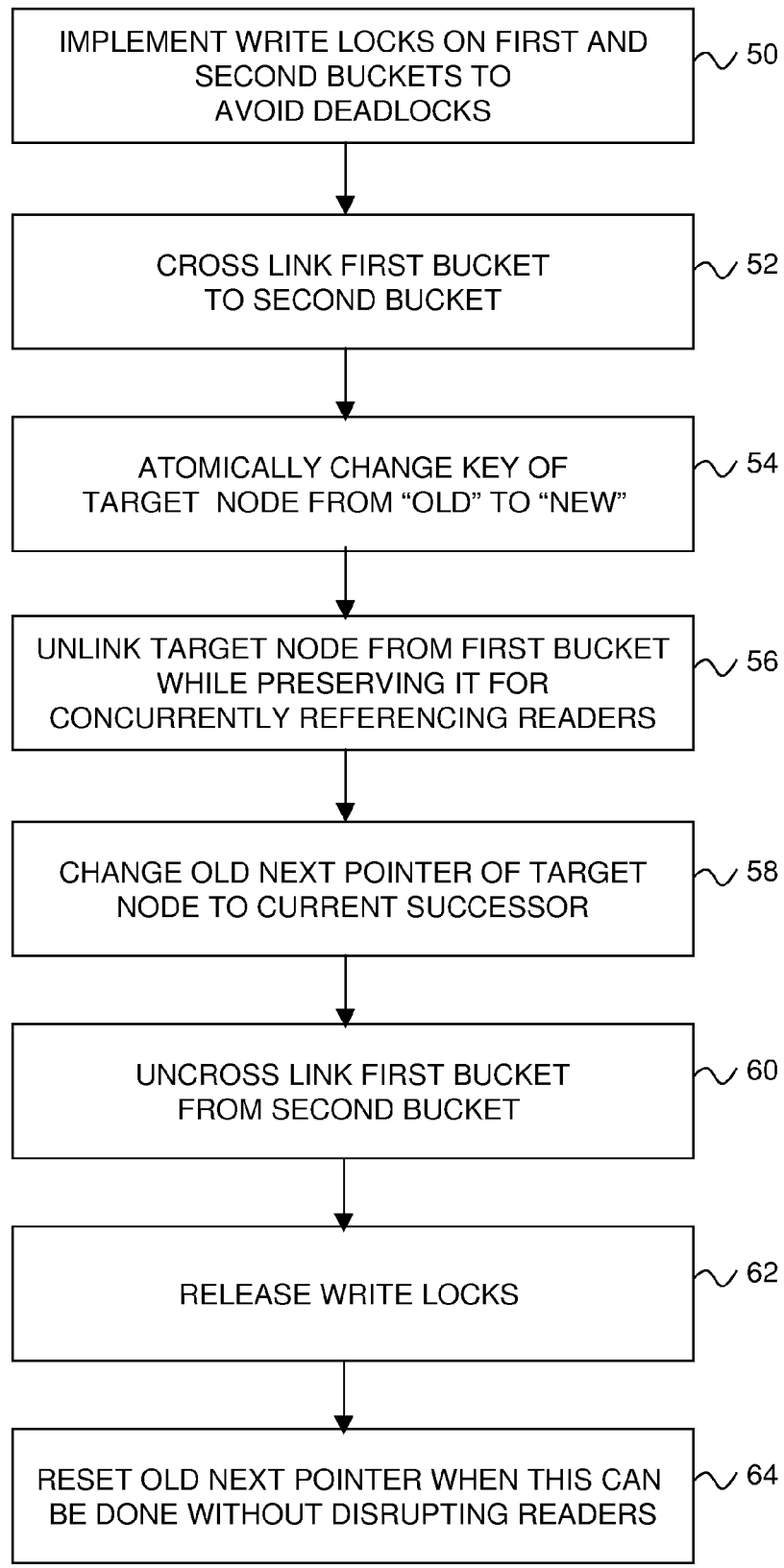
FIG. 7 is a flow diagram showing exemplary steps that may be used by a writer to move a list element between lists in accordance with FIGS. 6A-6G.

FIG. 6A illustrates the initial state of the hash table "H." Nodes $n_1$, $n_2$, and $n_3$ represent the nodes having keys ($n_1$.key, $n_2$.key and $n_3$.key) that hash to bucket "a." Nodes $n_4$ and $n_5$ represent the nodes having keys ($n_4$.key and $n_5$.key) that hash to bucket "b." Node $n_2$ currently has an original key "OLD", which hashes to bucket "a." It is assumed that this key needs to change to a new key "NEW," which hashes to bucket "b." The flow diagram of FIG. 7 illustrates the various steps described hereinafter for performing the desired key update.

Figure 6B:
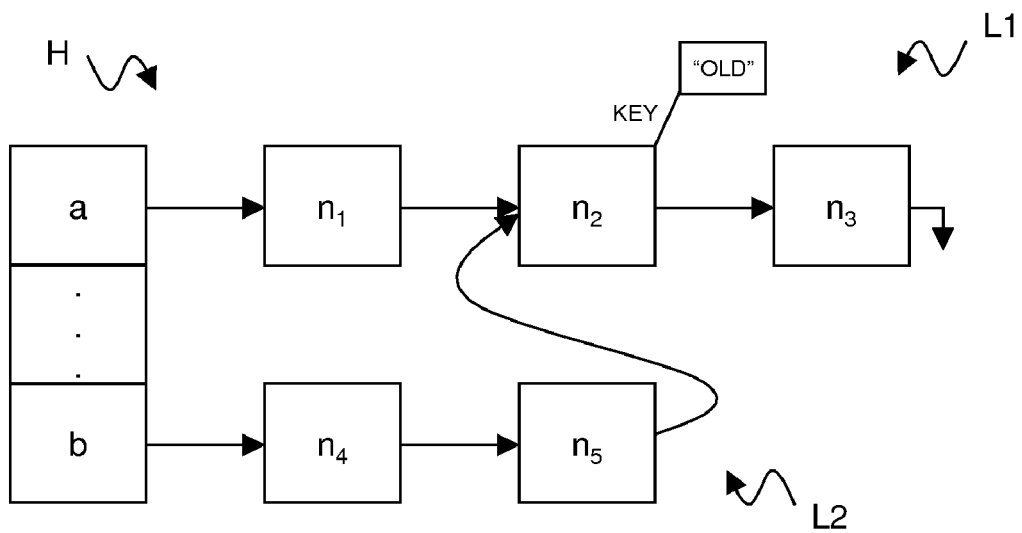
Figure 6C:
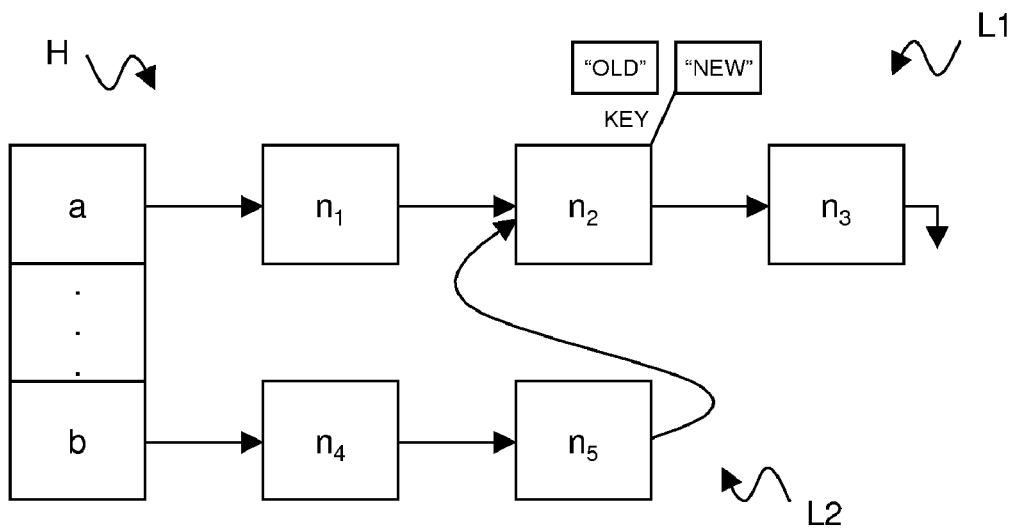
Figure 6D:
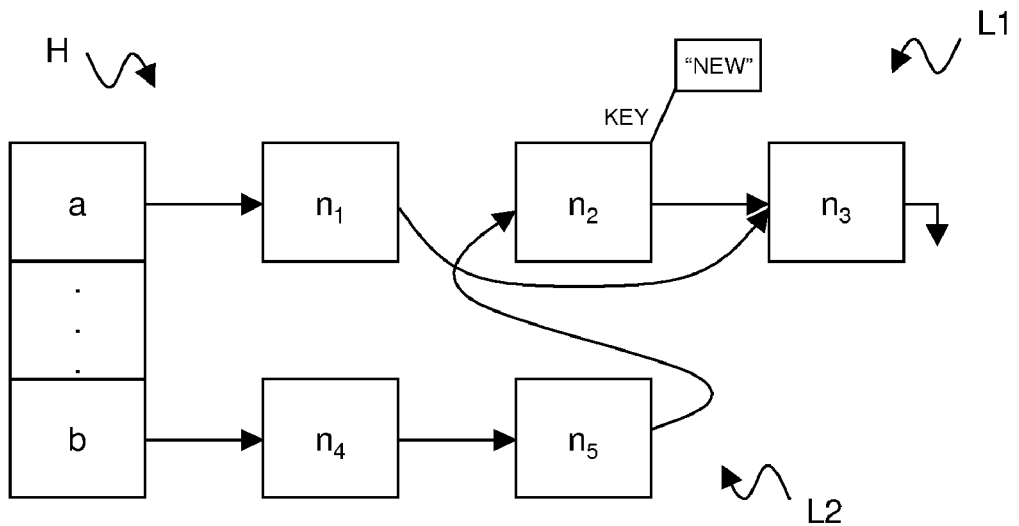
Figure 6E:
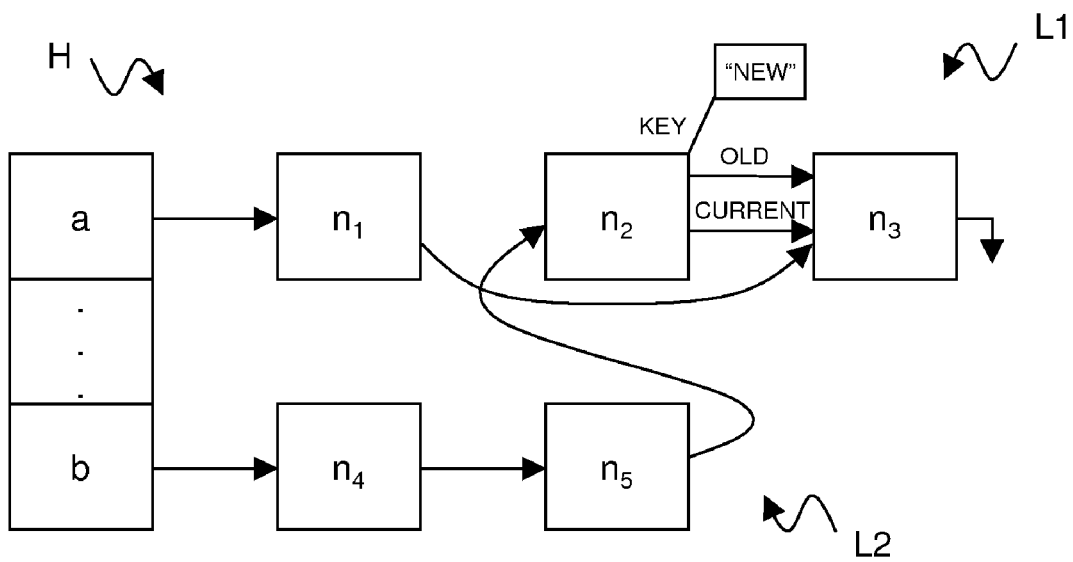
Figure 6F:
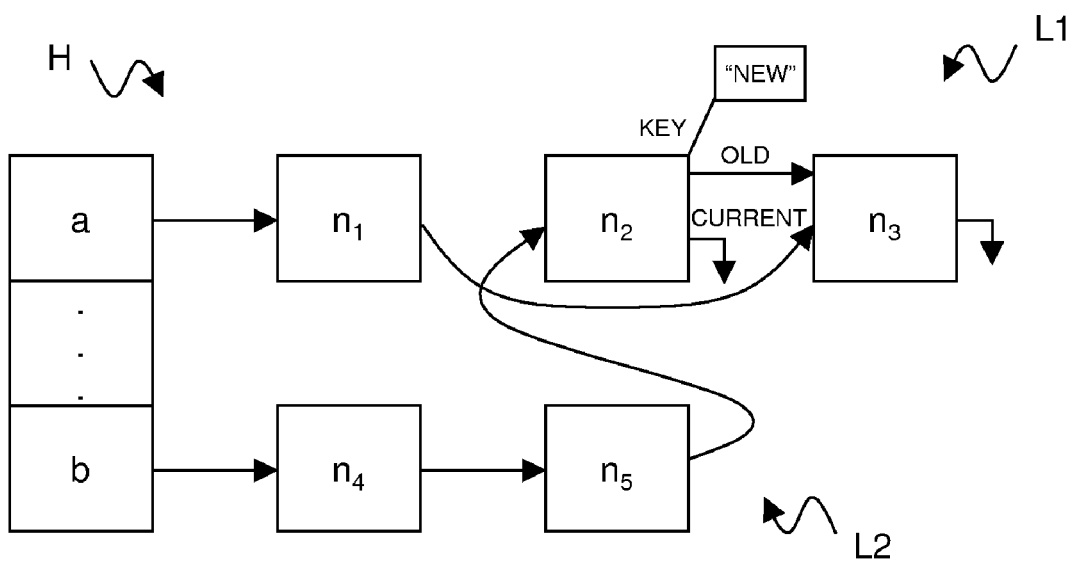
Figure 6G:
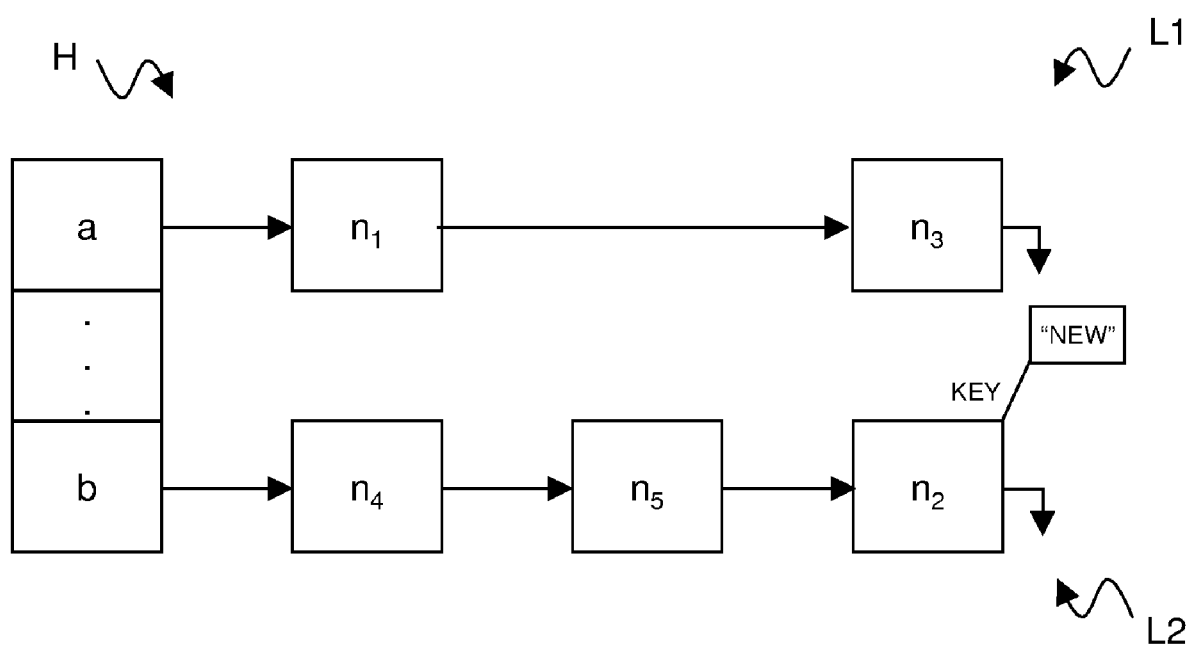

In a first step 50 of FIG. 7, the writer that performs the key update obtains write locks in a defined order for the hash buckets "a" (the first bucket) and "b" (the second bucket) to avoid deadlocks. In lieu of using write locks in step 50, writers could also use other known write-side synchronization techniques As shown in FIG. 6B (step 52 of FIG. 7), bucket "a" is cross-linked to bucket "b" by pointing the tail of bucket "b" ($n_5$.next) to the target node $n_2$. Both hash chains now include $n_2$. As shown in FIG. 6C (step 54 of FIG. 7), the key of the target node $n_2$ is changed atomically from "OLD" to "NEW." As shown in FIG. 6D (step 56 of FIG. 7), the target node $n_2$ is unlinked from the bucket "a" without disrupting readers that may be currently referencing this node. This is done by unlinking the target node $n_2$ from its predecessor element node $n_1$ and linking the predecessor node $n_1$ to the target node's successor node $n_3$. In other words, $n_1$.next is changed from $n_2$ to $n_3$. As shown in FIG. 6E (step 58 of FIG. 7), the old next pointer of the target node $n_2$ is set to the current next pointer so that both next pointers point to $n_3$. In other words, $n_2$.oldnext=$n_2$.next=$n_3$. A write memory barrier may then be implemented to ensure that the change of $n_2$'s old next pointer to will appear to other processors as preceding subsequent step 60 which hash buckets "a" and "b" are unlinked from each other. Otherwise, a reader reaching the updated $n_2$ node might not find $n_2$'s old next pointer to $n_3$. As shown in FIG. 6F (step 60 of FIG. 7), bucket "a" is uncross-linked from bucket "b" by unlinking the target node $n_2$ from its successor node $n_3$. In other words, the current next pointer $n_2$.next is changed from $n_3$ to NULL. The old next pointer $n_2$.oldnext continues to point to $n_3$. Thus, readers currently pointing to $n_2$ will have their search cut short before seeing $n_3$, but they will then search the old next pointer $n_2$.oldnext and find $n_3$. The previously acquired write locks for buckets "a" and "b" are then released in step 62 of FIG. 7. As shown in FIG. 6G (step 64 of FIG. 7), the target nodes old next pointer $n_2$.oldnext may be cleared after it is safe to do so without disrupting readers that may have been referencing node $n_2$ when the current write operation commenced. The target node's "OLD" key may also be freed. As in the first embodiment, there are various ways that these deferred operations may be performed, including RCU (Read-Copy Update), hazard pointers, and other synchronization techniques. Alternatively, step 64 could be omitted in some implementations.

Comparison of First, Second and Third Embodiments

It will be appreciated that the various embodiments described above place different burdens on readers and writers. The first embodiment places no additional burden on readers, apart from occasionally searching one extra node (the target node copy) when they happen to run concurrently with a writer changing the target node's key. Thus, the first embodiment should scale most efficiently for readers. On the other hand, this embodiment requires writers to copy the target node, and invalidates any pointers to that node held outside a lock. Such pointers could be maintained by tasks that desire to reference a node without the overhead of repeated hash table lookups for the node. These pointers might otherwise remain valid through the use of reference counting. Storing a data pointer in the nodes and only returning data pointers rather than node pointers would avoid this issue, but introduces an additional level of indirection with every search.

The second embodiment requires readers to search additional pointer elements (in the array "A") on every search, and the third embodiment requires readers that are searching certain nodes (with NULL next pointers) to search additional nodes. The second embodiment can bound the number of additional array elements searched, while the third embodiment allows a potentially exponential number of additional nodes to be searched in the worst case. Furthermore, the second embodiment (when used with a fixed array) and the third embodiment must in some circumstances wait for existing readers before modifying nodes in order to have an appropriate additional node pointer available. On the other hand, the second and third embodiments both avoid copying nodes and invalidating long-held node pointers. Overall, while the second and third embodiments may provide greater efficiency in some scenarios, the first embodiment may be the most straightforward, efficient, and general solution for lockless hash table lookups.

There is also a fourth alternative for resolving the hash bucket cross-linking without disturbing concurrent readers searching for nodes in the old hash chain that follow the target node. According to this alternative, whenever a lookup fails as a result of a reader being unable to reach nodes following the target node, the reader could fall back to locking (or other synchronization methods) and retrying the search. Although this alternative no longer provides guaranteed non-blocking behavior for the reader, it does provide a simple implementation, and may be practical in cases where a failed lookup requires more work than a successful lookup anyway. An example of this would be the dentry cache in recent versions of the Linux® kernel. Because a failed dentry lookup requires a trip to the disk, the kernel retries failed dentry lookups with locks held ("lock-and-try-again") as a performance optimization.

Figure 8:
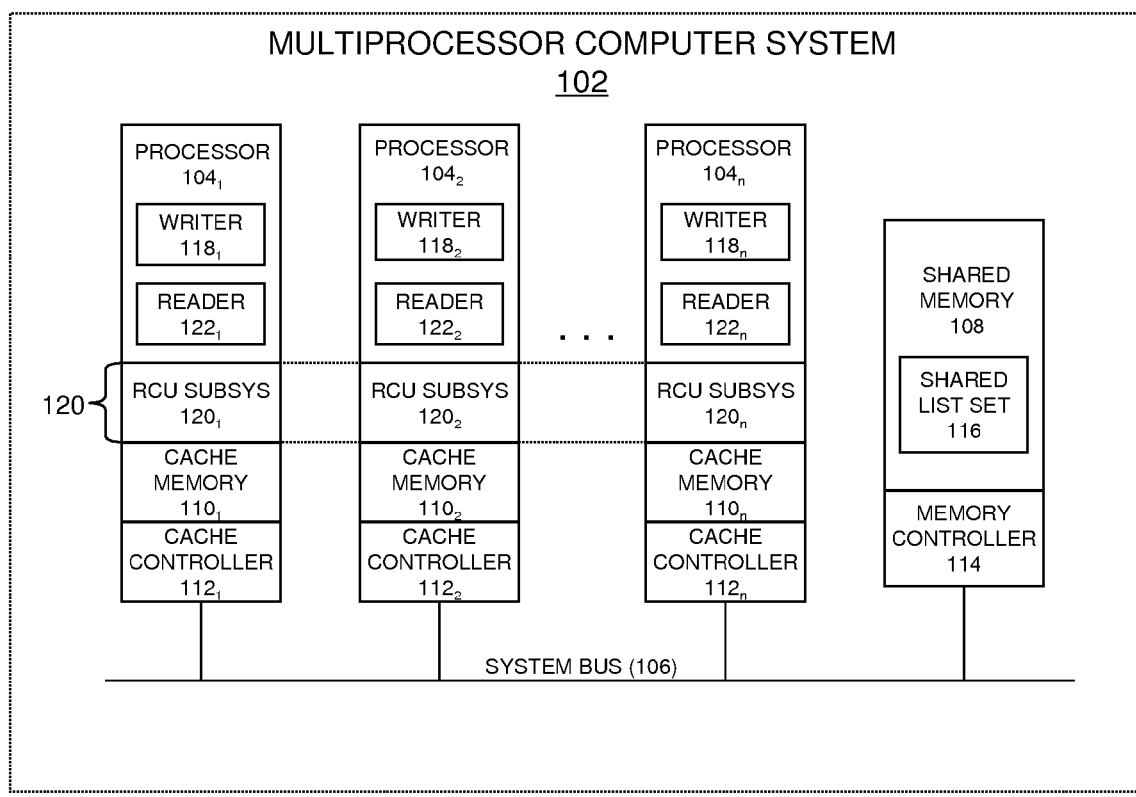
FIG. 8 is a functional block diagram showing a multiprocessor computing system that represents one exemplary environment in which the present invention can be implemented.

Turning now to FIG. 8, an exemplary computing environment in which the present invention may be implemented is illustrated. In particular, a symmetrical multiprocessor (SMP) computing system 102 is shown in which multiple processors $104_1$, $104_2$ ... $104_n$ are connected by way of a common system bus 106 to a shared memory 108. Respectively associated with each processor $104_1$, $104_2$ ... $104_n$ is a conventional cache memory $110_1$, $110_2$ ... $110_n$ and a cache controller $112_1$, $112_2$ ... $112_n$. A conventional memory controller 114 is associated with the shared memory 108. The computing system 102 is assumed to be under the management of a single multitasking operating system adapted for use in an SMP environment. If desired, a uniprocessor system (not shown) could be used in lieu of the multiprocessor system 102.

It is further assumed that write operations executed within processes, threads, or other execution contexts will periodically perform updates on a shared set of linked lists 116 stored in the shared memory 108. By way of example only, the shared list set 116 could be a directory entry cache or directory hash table and the lists thereof could contain file system directory entry elements. It will be appreciated that the invention may also be used in connection with many other types of lists that may or may not be hash table buckets (e.g., any list of key-value pairs). Reference numerals $118_1$, $118_2$ ... $118_n$ illustrate individual data write operations that may periodically execute on the several processors $104_1$, $104_2$ ... $104_n$. In the present case, the updates performed by the writers $118_1$, $118_2$ ... $118_n$ will involve moving a list element from one list to another, such as could occur if a directory entry element is renamed and moved between lists in a directory entry cache or directory hash table. In that case, the renaming of an element would in many cases cause it to hash to a different hash chain. To facilitate such updates, the writers $118_1$, $118_2$ ... $118_1$ may be programmed to perform list operations such as those described above in the preceding discussion. A read-copy update (RCU) subsystem 120 may also be implemented on the processors $104_1$, $104_2$ ... $104_n$, as by periodically executing respective read-copy update instances $120_1$, $120_2$ ... $120_1$ as part of their operating system functions. The RCU subsystem 120 may be used for performing deferred clean up operations on the target node (such as freeing the node or changing its next pointer) in a manner that does not impact concurrent readers, as earlier described. As further discussed, other techniques for deferring such clean up operations, such as hazard pointers, may also be used. Alternatively, there may be cases where no clean up operations need to be performed.

The processors $104_1$, $104_2$ ... $104_n$ also execute readers $122_1$, $122_2$ ... $122_n$ that perform lookup operations on the shared list set 116. Each lookup operation is assumed to entail an element-by-element traversal of a linked list until an element which is the target of the lookup is found. If the shared list set 116 is a directory entry cache or directory hash table, the linked list being traversed will be selected according to the name and parent directory of the lookup target. Such lookup operations will typically be performed far more often than updates, thus satisfying one of the premises underlying the use of read-copy update.

Figure 9:
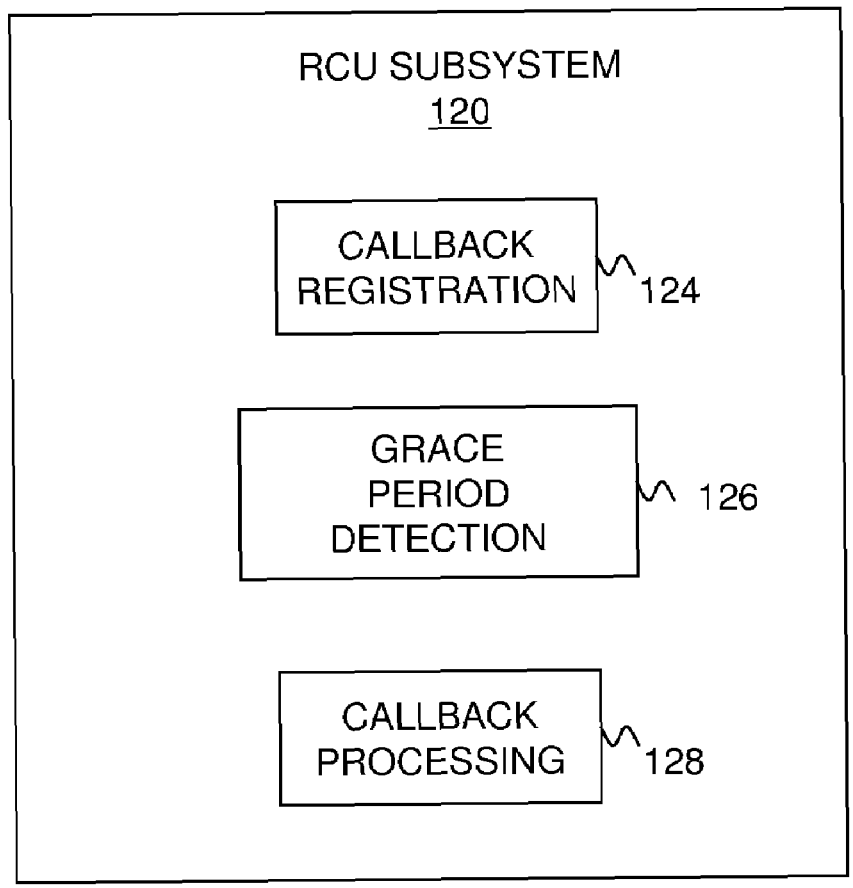
FIG. 9 is a functional block diagram showing a read-copy update subsystem implemented by each processor in the multiprocessor computer system of FIG. 8.

As shown in FIG. 9, each of the read-copy update subsystem instances $120_1$, $120_2$ ... $120_n$, if present, includes a callback registration component 124. The callback registration component 124 serves as an API (Application Program Interface) to the read-copy update subsystem 120 that can be called by the writers $118_2$ ... $118_n$ to register requests for deferred (second phase) data element updates following initial (first phase) updates performed by the writers themselves. As is known in the art, these deferred update requests involve the removal of stale data elements, and will be handled as callbacks within the read-copy update subsystem 120. Each of the read-copy update subsystem instances $120_1$, $120_2$ ... $120_n$ additionally includes a conventional read-copy update grace period detection mechanism 126, together with a callback processing mechanism 128 adapted to process callbacks registered by the updaters $118_1$, $118_2$ ... $118_n$. Note that the functions 126 and 128 can be implemented as part of a kernel scheduler, as is conventional.

Figure 10:
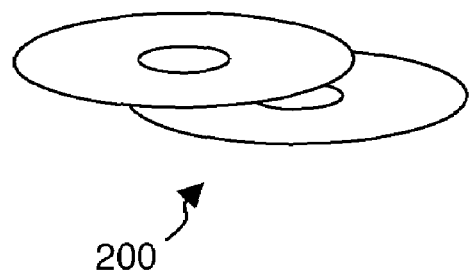
FIG. 10 is a diagrammatic illustration of storage media that can be used to store a computer program product for implementing read-copy update grace period detection functions in accordance with the invention.

Accordingly, a technique has been disclosed that allows lockless hash table lookups while performing key updates on hash table elements. More generally, the technique allows list elements to be atomically moved from one list of key-value pairs to another without disrupting concurrent readers that traverse the lists without locks. It will be appreciated that the foregoing concepts may be variously embodied in any of a data processing system, a machine implemented method, and a computer program product in which programming logic is provided by one or more machine-useable media for use in controlling a data processing system to perform the required functions. Exemplary machine-useable media for providing such programming logic are shown by reference numeral 200 in FIG. 10. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical or semiconductor system or apparatus or device that can contain, store, communicate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for moving a shared list element from a first list to a second list, comprising:

making said list element appear simultaneously in said first list and said second list under a first key associated with said first list;

changing said first key associated with said first list to a second key associated with said second list;

making said list element appear only in said second list under said second key associated with said second list; and the foregoing operations being implemented using a linking/unlinking technique selected from a group that includes a first alternative linking/unlinking technique, comprising:

creating a copy of said list element on said first list and appending it to the end of said first list;

unlinking said list element from its predecessor element and linking said predecessor element to said list element's successor element;

cross-linking said first list to said second list by linking the last element of said second list to said list element copy on said first list; and updating a key associated with said list element copy and uncross-linking said first list from said second list by unlinking said list element copy from said first list.

2. A method in accordance with claim 1, wherein said first and second lists comprise hash table buckets in a hash table and said key is a hash table element key that determines a hash bucket to which said list element is assigned.

3. A method in accordance with claim 1, wherein said group from which said linking/unlinking technique is selected further comprises a second alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

adding a pointer to said successor element to an array of pointers to additional elements; and uncross-linking said first list from said second list by unlinking said list element from said first list.

4. A method in accordance with claim 3, wherein said group from which said linking/unlinking technique is selected further comprises a third alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

setting an old next pointer associated with said list element to a current next pointer associated with said list element; and uncross-linking said first list from said second list by unlinking said list element from said first list by changing said current next pointer to NULL.

5. A method in accordance with claim 1, wherein said method comprises having readers attempting to search said first list retry said search using a synchronization technique in the event of a search failure due to making said list element appear only in said second list.

6. A data processing system having one or more data processors, said system being adapted to move a shared list element from a first list location to a second list location, as by:

making said list element appear simultaneously in said first list and said second list under a first key associated with said first list;

changing said first key associated with said first list to a second key associated with said second list;

making said list element appear only in said second list under said second key associated with said second list; and the foregoing operations being implemented using a linking/unlinking technique selected from a group that includes a first alternative linking/unlinking technique, comprising:

creating a copy of said list element on said first list and appending it to the end of said first list;

unlinking said list element from its predecessor element and linking said predecessor element to said list element's successor element;

cross-linking said first list to said second list by linking the last element of said second list to said list element copy on said first list; and updating a key associated with said list element copy and uncross-linking said first list from said second list by unlinking said list element copy from said first list.

7. A system in accordance with claim 6, wherein said first and second lists comprise hash table buckets in a hash table and said key is a hash table element key that determines a hash bucket to which said list element is assigned.

8. A system in accordance with claim 6, wherein said group from which said linking/unlinking technique is selected further comprises a second alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

adding a pointer to said successor element to an array of pointers to additional elements; and uncross-linking said first list from said second list by unlinking said list element from said first list.

9. A system in accordance with claim 8, wherein said group from which said linking/unlinking technique is selected further comprises a third alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

setting an old next pointer associated with said list element to a current next pointer associated with said list element; and uncross-linking said first list from said second list by unlinking said list element from said first list by changing said current next pointer to NULL.

10. A computer program product moving a shared list element from a first list location to a second list location, comprising:

one or more computer useable storage media;

program instructions stored on said one or more computer useable storage media for programming a data processing platform to operate as by:

making said list element appear simultaneously in said first list and said second list under a first key associated with said first list;

changing said first key associated with said first list to a second key associated with said second list;

making said list element appear only in said second list under said second key associated with said second list; and the foregoing operations being implemented using a linking/unlinking technique selected from a group that includes a first alternative linking/unlinking technique, comprising:

creating a copy of said list element on said first list and appending it to the end of said first list;

unlinking said list element from its predecessor element and linking said predecessor element to said list element's successor element;

cross-linking said first list to said second list by linking the last element of said second list to said list element copy on said first list; and updating a key associated with said list element copy and uncross-linking said first list from said second list by unlinking said list element copy from said first list.

11. A computer program product in accordance with claim 10, wherein said first and second lists comprise hash table buckets in a hash table and said key is a hash table element key that determines a hash bucket to which said list element is assigned.

12. A computer program product in accordance with claim 10, wherein said group from which said linking/unlinking technique is selected further comprises a second alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

adding a pointer to said successor element to an array of pointers to additional elements; and uncross-linking said first list from said second list by unlinking said list element from said first list.

13. A computer program product in accordance with claim 10, wherein said group from which said linking/unlinking technique is selected further comprises a third alternative linking/unlinking technique, comprising:

cross-linking said first list to said second list by linking the last element of said second list to said list element on said first list;

updating a key associated with said list element;

unlinking said list element from its predecessor element and linking said predecessor element to said list element's successor element;

setting an old next pointer associated with said list element to a current next pointer associated with said list element; and uncross-linking said first list from said second list by unlinking said list element from said first list by changing said current next pointer to NULL.

14. A computer program product for atomically moving a shared list element from a first list location to a second list location, comprising:

one or more computer useable storage media;

program instructions stored on said one or more computer useable storage media for programming a data processing platform to operate as by:

making said list element appear simultaneously in said first list and said second list under a first key associated with said first list;

atomically changing said first key associated with said first list to a second key associated with said second list;

making said list element appear only in said second list under said second key associated with said second list; and the foregoing operations being implemented using a linking/unlinking technique selected from a group that includes a first, second and third alternative linking/unlinking techniques, said first alternative linking/unlinking technique comprising:

creating a copy of said list element on said first list and appending it to the end of said first list;

unlinking said list element from its predecessor element and linking said predecessor element to said list element's successor element;

cross-linking said first list to said second list by linking the last element of said second list to said list element copy on said first list; and updating a key associated with said list element copy and uncross-linking said first list from said second list by unlinking said list element copy from said first list;

said second alternative linking/unlinking technique comprising:

cross-linking said first list to said second list by linking the last element of said second list to said list element on said first list;

updating a key associated with said list element;

unlinking said list element from its predecessor element and linking said predecessor element to said list element's successor element;

adding a pointer to said successor element to an array of pointers to additional elements; and uncross-linking said first list from said second list by unlinking said list element from said first list; and said third alternative linking/unlinking technique comprising:

cross-linking said first list to said second list by linking the last element of said second list to said list element on said first list;

updating a key associated with said list element;

unlinking said list element from its predecessor element and linking said predecessor element to said list element's successor element;

setting an old next pointer associated with said list element to a current next pointer associated with said list element; and uncross-linking said first list from said second list by unlinking said list element from said first list by changing said current next pointer to NULL.

* * * * *